United States Patent [19]

Michaels

[11] 3,743,212
[45] July 3, 1973

[54] FILM RETENTION MEANS FOR FILM CARTRIDGES

[75] Inventor: Bruno Michaels, Chicago, Ill.

[73] Assignee: Bell & Howell Company, Chicago, Ill.

[22] Filed: July 16, 1971

[21] Appl. No.: 163,155

[52] U.S. Cl............ 242/197, 226/83, 226/91, 242/210, 352/157
[51] Int. Cl.... G03b 1/04, G11b 15/32, G11b 23/04
[58] Field of Search............ 242/195, 197–200, 242/71.3, 71.4, 210; 226/52, 59, 76, 78, 154, 82, 91; 352/173, 157, 158

[56] References Cited
UNITED STATES PATENTS 2,879,993  3/1959  Scozzafava et al................ 226/82
3,613,977  10/1971  Egan................................. 226/91

*Primary Examiner*—Leonard D. Christian
*Attorney*—William F. Pinsak, John E. Peele, Jr. et al.

[57] ABSTRACT

A film cartridge for a projector has a means for retaining the free end of a film in engagement with a driving sprocket for conveniently feeding the film from the cartridge. The retaining means includes a biased arcuate plate member for resisting film being fed into the cartridge and a film guide rail cooperating with the plate member to hold the free end of the film in engagement with the sprocket teeth in a manner to permit the film to be fed out of the cartridge when turning the sprocket in one direction and to permit the film to alternatively disengage and engage the sprocket teeth when turning the sprocket in the opposite direction.

8 Claims, 4 Drawing Figures

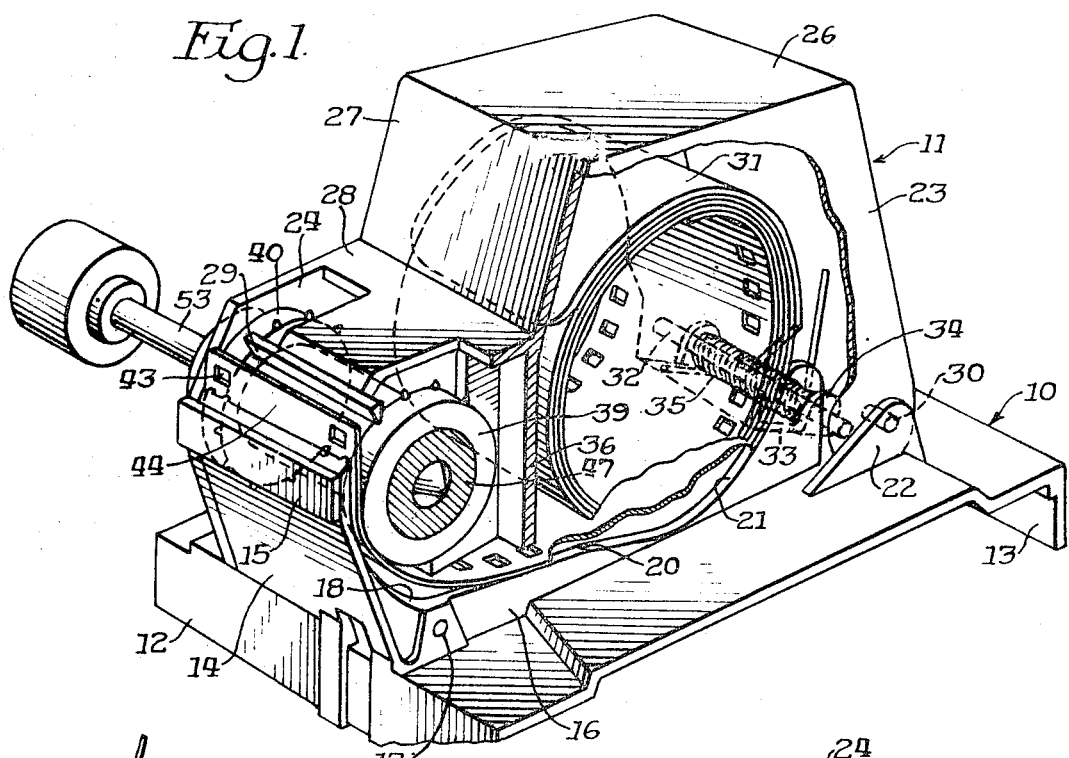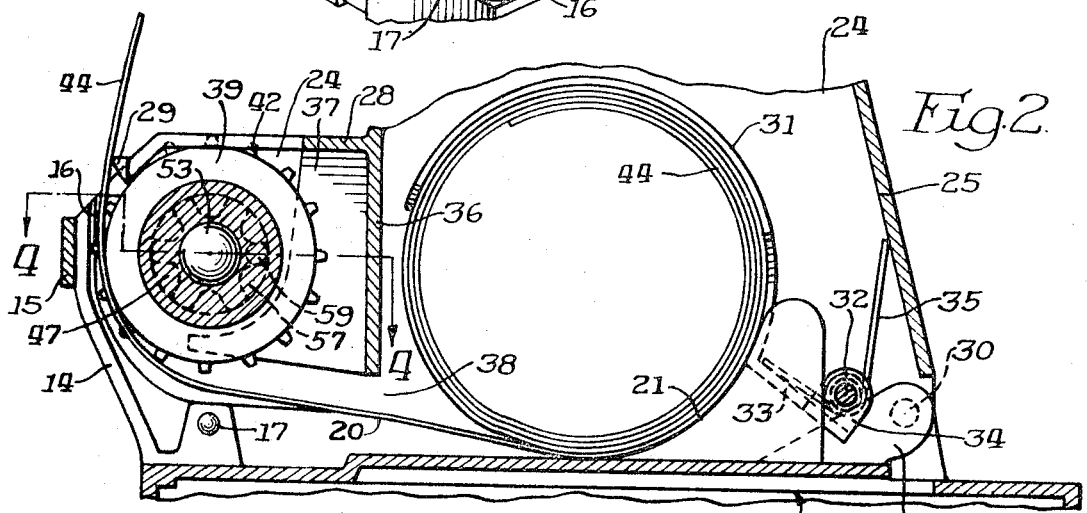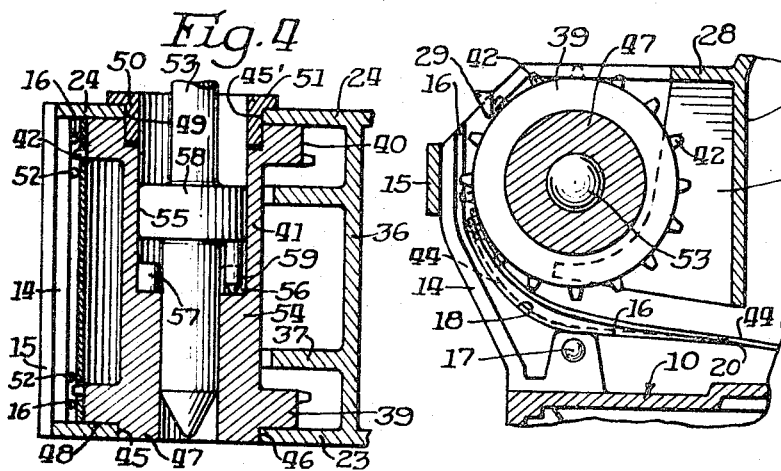
Inventor:
Bruno Michaels

FILM RETENTION MEANS FOR FILM CARTRIDGES

This invention relates to film retention means for film cartridges usable in a projector for handling perforated strip film. Particularly the invention is concerned with means for insuring the re-engagement of perforations in the film with the sprocket teeth when the rotation of the sprocket wheels is reversed after the teeth have fed the film into the magazine of the cartridge as far as possible.

Although the structure of the present invention is designed specifically for use in handling strip film that is usually driven intermittently to project each frame separately, it will be understood that the invention is also applicable to film that is projected as a continuous operation.

BACKGROUND OF THE INVENTION

In the projection of strip film, it is customary to rewind the film in the magazine after the last frame is projected. In cartridges, the film is driven by the sprocket wheel teeth that engage the film. The sprocket wheels are rotated manually or by any suitable reversible drive means. Heretofore, it has been practically impossible to stop the drive means before total disengagement of the driving teeth from the film perforation as the film is rewound into the magazine. Therefore, it has been necessary to re-engage the perforations adjacent the trailing end of the film with the driving teeth in order to drive the film out of the cartridge.

SUMMARY OF THE INVENTION

In the cartridge constructed in accordance with the present invention, the movement of the film into the cartridge is stopped automatically, even if the rotation of the driving sprocket wheel teeth continues while the perforations adjacent the trailing end of the film are still in position to be engaged by the teeth. When the rotation of the sprocket wheels is reversed, the teeth engage the film apertures and automatically drive the film out of the cartridge.

An object of the present invention is to provide a film retention means for a supply cartridge usable on a projector. The cartridge includes an area for storing a strip of film having perforations and a driving means cooperating with the free end of the film to provide a one-way driving action for stopping movement of the film into the cartridge when the free end of the film reaches the driving means.

Another object of the present invention is to provide a film retention means for a cartridge including a biasing means for resisting film movement into the cartridge for holding the free end of the film in contact with a sprocket wheel therein.

A further object of the present invention is to provide a film retention means for a cartridge including a guide rail having an abutment for urging the free end of the film into engagement with the sprocket wheel therein.

Another object of this invention is to provide a film retention means for a cartridge including a guide member holding the film engagement engagement with a sprocket wheel therein and having a surface diverging from the sprocket wheel to permit the free end of the film to disengage from the sprocket wheel while maintaining the free end in a position to be biased into engagement with the sprocket wheel.

Suitable structure by means of which the above noted and other advantages are attained will be fully described in the following specification, taken in conjunction with the accompanying drawings showing a preferred embodiment of the invention, in which:

FIG. 1 is a perspective view of a cartridge embodying the invention, with one side broken away to illustrate the interior structure;

FIG. 2 is a side view, partly in elevation and partly in section, with one side wall of the cartridge removed;

FIG. 3 is a view similar to the left end portion of FIG. 2, showing the film in its disengaged and engaged positions with the sprocket wheel teeth; and FIG. 4 is a cross-sectional view taken along the line 4—4 of FIG. 2.

DESCRIPTION OF THE ILLUSTRATED EMBODIMENT

In the drawings, the cartridge comprises a base 10 and a housing 11 each preferably molded of suitable plastic material as a separate integral unit. The base is provided with two depending walls 12 and 13 shaped to be interengaged with means on a projector for detachably securing the base to the projector. A front wall 14 projects upwardly at a slight forward angle from the front end of the base 10. The upper edge of the front wall 14 is reinforced by a transverse bar 15 secured to the outer surface of the wall 14. A pair of longitudinally extending parallel guide rails 16 project upwardly from the base and continue along the inner surface of the front wall. The guide rails are spaced apart a distance slightly less than the width of the filmstrip and are adapted to engage the longitudinal edge portion of the filmstrip outwardly of its perforations or apertures to support it as it is moved into or out of the cartridge. a boss 17 projects outwardly from each guide rail in spaced relationship to the front wall 14 for a purpose hereinafter disclosed.

A surface 18 of each guide rail 16 extending downwardly adjacent the front wall 14 is curved rearwardly to merge with the portion of the guide rail 16 extending upwardly from the base 10. As each guide rail extends rearwardly from the boss 17, it is inclined downwardly at a slight angle for a portion of its length, as indicated at 19 in FIG. 3, and at a sharper angle, as indicated at 20, rearwardly from the end of the slightly angled portion 19. The rear end portion of each guide rail curves upwardly, as indicated at 21 in FIG. 1. A pair of ears 22 project upwardly from the base 10 near its rear end outwardly of the guide rails for pivotally supporting the housing 11.

The housing 11 comprises a pair of side walls 23 and 24, a back wall 25, a top wall 26, a vertically disposed intermediate wall 27 depending from the front edge of the top wall 26, and a horizontally disposed intermediate wall 28 extending forwardly from the lower edge of the wall 27. The forward end of the wall 28 slopes downwardly and has a stripper plate 29 in spaced relationship to the upper edge of the front wall 14. The housing is pivotally secured to the base 10 by interengageable pins 30 and apertures on the ears 22 and the side walls 23 and 24. Preferably, each ear 22 is provided with the pins 30 integral therewith that extends inwardly in alignment with an aperture in each side wall 23 and 24. Each side wall 23 and 24 has an aperture (not shown) in its lower front edge portion adapted to be aligned with the bosses 17 when the cartridge is in closed position. The side walls 23 and 24 are sufficiently resilient to permit the apertures in the lower front edge portion of the side walls to snap over the bosses 17 and to secure the housing to the base. The outer ends of the bosses 17 are rounded to permit the side walls 23 and 24 to be readily disengaged from the bosses 17 when the cartridge is to be opened.

An arcuate plate 31 is pivotally mounted on a pin 32 extending transversely of the magazine adjacent the rear wall 25. The ends of the pin 32 are secured to the side walls 23 and 24 in any suitable manner. A foot piece 33 extending rearwardly from the lower end of the arcuate plate 31 is provided at each side with an upstanding ear 34 that is apertured to fit on the pin 32 inwardly of the side walls 23 and 24. A spring 35 coiled around the pin 32 between the ears 34 has one end bearing against the rear surface of the foot piece 33 and its other end bearing against the rear wall 25. The spring force against the foot piece constantly urges the arcuate plate 31 forwardly so that its free end abuts the inner surface of the wall 27 when the magazine is empty. The lower end of the arcuate plate, from which the foot piece 33 extends rearwardly, is adjacent the upwardly curved rear end portions 21 of the guide rails 16, so that the film moved rearwardly along the guide rails 16 is directed by the upwardly curved rear end portions 21 of the guide rails 16 into engagement with the inner surface of the arcuate plate 31, whereby the film is coiled within the magazine.

A vertical partition wall 36 depends from the wall 28 in approximate vertical alignment with the wall 27 and separates the respective rearward and forward portions of the housing into a filmstrip storage magazine and a feed roller compartment. The partition wall 36 is reinforced by laterally spaced vertical flanges 37 that project forwardly into the feed roller compartment. The partition wall 36 and the flanges 37 terminate a short distance above the upper edges of the guide rails 16 to provide a horizontal passageway 38 through which the film passes as it is fed into and out of the magazine.

The means for feeding the film in both directions comprises a pair of sprocket wheels 39 and 40 integral with a tubular member 41 axially aligned therewith. A plurality of radially extending sprocket teeth 42 are spaced circumferentially about each of the sprocket wheels 39 and 40 to coincide with the longitudinal spacing of the perforations 43 in a conventional strip film 44. The lateral spacing between the sprocket teeth 42 is the same as the lateral spacing between the perforations 43. As seen in FIG. 4, the side walls 23 and 24 are provided with axially aligned openings 45 and 45', respectively, of smaller diameter than the outside diameter of the sprocket wheels. The outer side of the sprocket wheel 39 is provided with an external annular recess 46 leaving an outwardly projecting end portion 47 adapted to be journalled in the opening 45 with the recessed surface 48 abutting the inner surface of the side wall 23. The outer side of the sprocket wheel 40, which abuts the inner surface of the side wall 24 when the end portion 47 of the sprocket wheel 39 is journalled in the opeing 45, is provided with an internal axial recess 49 having an outer circumference coinciding with the circumference of the opening 45'. The sprocket wheel 40 is secured in place by a flanged collar 50 that is press fitted within the recess 49. The annular flange 51 abuts the outer surface of the side wall 24 adjacent the opening 45'.

When the tubular member 41 is mounted in the feed roller compartment, the forward edges of the sprocket wheels 39 and 40 are close to the upper edge portion of the front wall 14 and cooperate therewith to form a restricted zone adjacent the upper edge of the front wall 14. The circumference described by the outer edges of the teeth 42 extends forwardly of the plane described by the outer edges of the guide rails 16, which project rearwardly from the inner surface of the front wall 14. A pair of longitudinally extending ribs 52, similar to the guide rails 16 and parallel thereto, extend rearwardly from the front wall 14 in transversely spaced relationship between the guide rails 16. As the film 44 enters the restricted zone between the sprocket wheels 39 and 40 and the front wall 14, the guide rails 16 and the ribs 52 press the film 44 toward the sprocket wheels 39 and 40 to move the apertures of the film 44 into a driving engagement with the sprocket teeth 39 and 40. The guide rails 16 and the ribs 52 project only a short distance rearwardly of the front wall 14 to permit the sprocket teeth 42 to move out of the film apertures shortly after passing below the restricted zone. Thus, the guide rails 16 diverge from the sprocket wheels 39 and 40 to permit the film 44 to disengage therefrom.

The sprocket wheels 39 and 40 are driven by a shaft 53 rotatably mounted in the axial bore of the tubular member 41. The shaft 53 may be rotated manually or by any suitable reversible motor. The portion of the axial bore extending through the outer end portion 54 of the tubular member 41 has a diameter approximately equal to the outer end portion of the shaft 53 which is journalled therein, to provide a good bearing surface for the outer end of the shaft. The inner end portion of the bore is enlarged, as indicated at 55, to provide an internal annular shoulder 56 intermediate the length of the tubular member 41. A plurality of fins or other protuberances 57 extend inwardly of the cylindrical surface of the enlarged portion 55 of the bore adjacent the shoulder 56. The protuberances 57 are uniformly spaced circumferentially of the bore, and their inner ends terminate short of the circumference of the restricted portion of the bore.

An annular collar 58 having an outer diameter approximately equal to the diameter of the enlarged portion 55 of the bore is mounted on the shaft 53 and rigidly secured thereto intermediate the length of the shaft 53. The collar 58 provides a support area for the shaft in spaced relationship to the shoulder 56 and cooperates with the bearing surface at the outer end of the shaft 53 to maintain the axial alignment of the shaft 53 when it is mounted in the bore of the tubular member 41. The collar 58 has an axially extending finger 59 projecting from its outer side, and having a length substantially equal to the axial distance between the outer side of the collar 58 and the shoulder 56. The finger 59 fits between adjacent protuberances 57 when the shaft 53 is positioned within the bore of the tubular member 41, and engages one of them when the shaft is rotated, to provide a positive drive means for rotating the tubular member 41, and the sprocket wheels 39 and 40 integral therewith, in either direction as the shaft 53 is rotated.

Rotation of the sprocket wheels 39 and 40 in one direction, with the sprocket teeth 42 engaging the perforations 43 of the film 44, pulls the film 44 from the projector with which the film cartridge cooperates and pushes it toward the arcuate plate 31 in the magazine compartment of the film cartridge. As shown in FIG. 2, the film being rewound in the magazine moves in a plane spaced from the guide rails 16 for a portion of their length adjacent the front wall 14, and then in engagement with the guide rails as it approaches the magazine. As the film is pushed into the magazine, it engages the arcuate plate 31, and is wound into coil formation with the outermost convolution of the coil engaging the inner surface of the arcuate plate 31. The arcuate plate 31, being biased by the spring 35, applies a force on the film 44 to resist movement of the film 44 into the magazine.

The film retention means has a one-way driving action provided by the cooperation of the sprocket wheels 39 and 40, the guide rails 16 and the arcuate plate 31. A plurality of sprocket teeth 42 engage adjacent film perforations to provide the driving force for the film until the free end of the film 44 passes through the restricted zone between the front edges of the sprocket wheels 39 and 40 and the front wall 14. When the free end of the film 44 being rewound in the magazine has passed through the restricted zone, and only the two apertures adjacent the free end of the film 44 are each engaged by one sprocket tooth 42, the resisting movement of the film 44 by the arcuate plate 31 is greater than the driving force by the sprocket wheels 39 and 40 and causes the film to push downwardly against the surface 18 of the guide rails 16 adjacent the front wall 14. The curvature of the film 44 causes the teeth 42 to slide out of the last two apertures of the film 44, and thus stops the movement of the film into the magazine of the cartridge, even when the rotation of the sprocket wheels continues. The free end of the film 44 is still in position for the last two apertures of the film 44 to be engaged by the teeth 42 when the rotation of the sprocket wheels 39 and 40 is reversed.

The tendency of the film to curl causes slight curvature of the free end portion of the film 44. The curvature of the film end causes the sprocket teeth 42 to move out of engagement of the film apertures when the sprocket wheels 39 and 40 are rotated counterclockwise (as viewed in FIGS. 2 and 3). Also, the curvature causes the sprocket teeth 39 and 40 to re-engage the film apertures so the film end can be driven out of the magazine when the rotation of the sprocket wheels 39 and 40 is reversed. The film 44 being pulled out from the magazine is moved out of engagement with the sprocket teeth 39 and 40 by the stripper bar 29 as the film moves upwardly out of the restricted zone.

What is claimed is:

1. Apparatus for retaining the free end of a film in a projector comprising:
   storage means for the film;
   means driving the film to and from said storage means; and
   means stopping movement of the film into said storage means when the free end of the film reaches said driving means while maintaining engagement of the film with said driving means, said film stopping means including biasing means applying a force on the film in a direction to resist movement of the film into said storage means and film guide means having an abutment urging the free end of the film toward said driving means whereby the free end of the film alternately disengages and engages said driving means while said driving means continues to rotate in the direction for moving film into said storage means.

2. The apparatus as defined in claim 1 wherein said biasing means is arranged in said storage means.

3. The combination as defined in claim 2 wherein said storage means supports the film in a roll form and said biasing means includes an arcuate member applying pressure on the roll of film.

4. The apparatus as defined in claim 1 further comprising a film guide rail having an abutment urging the free end of the film into engagement with said driving means.

5. A film cartridge comprising:
   a magazine portion for substantially enclosing a strip of film having perforations;
   a feed roller portion;
   a feed roller having film perforation engaging members and being rotatably supported in said feed roller portion to feed film into and out of said magazine portion; and
   means cooperating with said feed roller for guiding film to and from said magazine portion, and for preventing said free end of said film from being driven past said feed roller during feeding of film into said magazine portion, and for causing said film end to engage said perforation engaging members of said feed roller for feeding film from said magazine portion after winding of film into said cartridge.

6. A film cartridge as in claim 5 wherein said magazine portion includes biasing means applying a force resisting movement of said film into said magazine portion.

7. A film cartridge as in claim 5 including film guide members for guiding film through said feed roller portion and into coiled condition in said magazine portion.

8. A film cartridge comprising:
   a magazine for supporting a roll of film;
   a compartment having a front wall;
   a sprocket wheel having teeth rotatably mounted in said compartment;
   means for rotating said sprocket wheel to feed film into and out of said magazine;
   means resisting movement of film being fed into said magazine;
   a pair of guide rails straddling said teeth and extending along said front wall;
   said teeth and said guide rails forming a restricted zone through which film passes as it is fed to and from said magazine; and
   said guide rails diverging from said sprocket wheel and permitting the trailing end of said film being fed into said magazine to alternately disengage and engage the sprocket teeth thereby stopping movement of said film into said magazine while permitting movement out of said magazine.

* * * * *